Jan. 14, 1941. C. G. MATTHAEI ET AL 2,228,926
FASTENER FOR TRANSMISSION BELTS AND THE LIKE
Filed July 24, 1937 2 Sheets-Sheet 1

Inventors
Curt Gustav Matthaei
Wilhelm Klopf
by Roberts, Cushman & Woodbury
Att'ys.

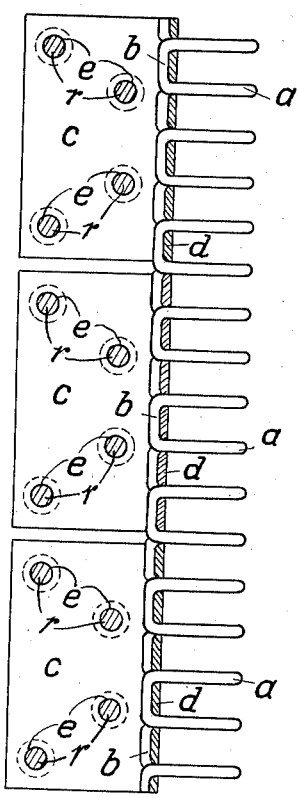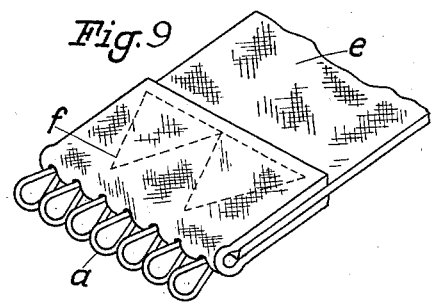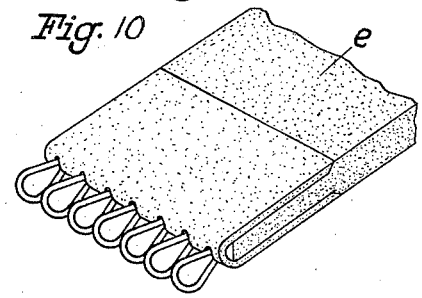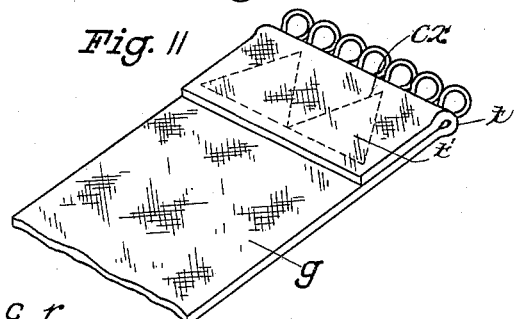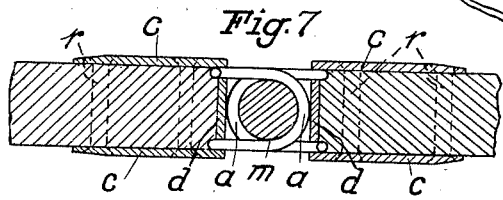

Patented Jan. 14, 1941

2,228,926

UNITED STATES PATENT OFFICE 2,228,926

FASTENER FOR TRANSMISSION BELTS AND THE LIKE

Curt Gustav Matthaei and Wilhelm Klopf, Offenbach, Germany, assignors to the firm of C. Matthaei, Offenbach, (Main) Germany Application July 24, 1937, Serial No. 155,365
In Germany August 27, 1936

5 Claims. (Cl. 24—33)

This invention relates to a hinged fastener for power transmission belts and the like of the kind which consists of interpenetrating hinge-like wire eyes held together by a hinge pin. Previous belt fasteners of this kind have for the most part been composed of inserted hooks inserted by pressing them into the ends of the belt. This known kind of belt fastener presents certain drawbacks in use which are to be prevented by the present improvement. The pressed-in points of the known hooks become loose, especially when used with strongly elastic substances, so that, in the case of heavy loads the hooks are drawn out of the belt and the fastener becomes gradually loose, commencing at the edge.

A further drawback of these known belt fasteners consists in that comparatively complicated and expensive tools are necessary for pressing the hooks into the ends of the belt.

The present invention obviates these drawbacks by providing wire eyes held together by the hinge pin which are formed by a group of parallel arcs, loops or eyes of a continuous wire which is anchored to the end of the belt by means of another group of arcs, loops or eyes parallel between themselves but inclined to the first-mentioned ones. These continuously woven wire loopings can have the form of double zig-zags with limbs of equal or different length or of helical turns or the like. The plane of the loops forming the hinge eyes can be perpendicular to those of the anchoring eyes or form an acute angle therewith. The width and length of the hinge eyes can be different from those of the anchor eyes. The anchor eyes can be fastened directly to the end of the belt, for example in known manner by screws, nails, rivets, or the like, which if necessary are inserted alternately through eye ends of different length so that they are at different distances from the end of the belt. The fastening of the anchor eyes to the end of the belt can, however, also take place indirectly, the so-called hinge eyes forming the hinge being passed through parallel slots in the cross bar part of a holder or clamp of U-shaped cross-section, the flanges of which serve for anchoring the holder to the end of the belt and at the same time for strengthening it. Consequently there is nothing further required for the fastening of the wire looping and its U-clamp than placing the latter, after inserting the wire looping through the cross bar slots, onto the ends of the belt in rider form and fastening the holder to the belt by means of screws, rivets, nails and the like inserted in holes therein. The joint and anchor eyes combined into a continuous wire looping thus form to a certain extent a unitary fastening element which is anchored onto the ends of the belt, to be brought into hinge-like engagement with another like element of the adjacent belt end and held together by the known hinge pin. In the simplest form, the looping is formed of limbs of equal length. The eyes can, however, be made of different lengths so that short eyes alternate with the longer ones in the row. This embodiment permits, as already mentioned, a durable fastening by screws, nails or rivets inserted alternately through eyes of different length, so that the fastening screws, nails or rivets lie in the alternating rows formed by the eyes.

The combination of the wire looping with the U-shaped clamp consisting of metal, vulcanised fibre or some other pressed artificial material, and the fixing of the U-clamp to the ends of the belt, presents to the belt pulleys surfaces which increase the slip of the running belt. In order to mitigate this, these flat surfaces can be covered with slip reducing masses such as rubber, rawhide, pressed material, artificial resin, hard paper, and the like. In cases where woven belts are used, as for example for conveyor bands in paper making machines and in laundries, and also for thin belt drives in weaving and spinning mills, the anchor eyes are preferably made so narrow, for example by pressing the wire looping flat on one side, that the width of the eye corresponds approximately to the thickness of the belt. Instead of a U-clamp of metal or similar rigid material, a U-clamp of flexible material for example of a metal wire or textile fibre fabric can be used in such cases. A sufficiently long piece of fabric, preferably of the nominal width of the belt to be fastened, is folded into U-shape and the joint eyes of the flattened wire looping are passed through the fold, which now forms the cross piece of the U-clamp, until the anchor eyes rest on the inside of the fold, whereupon the U-clamp so obtained is placed with its flanges astride the end of the belt and is fixed onto this by sewing or the like. If the fabric is perforated or slotted at the fold corresponding to the distances of the joint eyes, the slots are preferably so punched that they do not cut the fabric fibres but come between the fibres. Instead of passing the wire looping through perforations, the projecting eyes can also be woven or vulcanised into the fabric.

The replacement of the known individually inserted hooks and the like by the composite wire looping according to the invention presents further possibilities of use, for example in combination with the known protecting plate for the eye limb. There is anchored in this protecting plate, as in the U-clamp, a wire looping in which the distance of the joint eyes is equal to the distance of the joint eyes of the belt fastener. The protecting plate so formed is inserted with its hinge eyes into the butt point of the ends of the belt, which is provided with the hinge-like joint eyes engaging each other, to a certain extent like a third hinge member, and connected by the common hinge pin, so that the butt joint engaging in the form of a hinge is bridged over by the protecting plate.

Various embodiments of the invention are shown by way of example in the accompanying drawings.

Figure 7 shows a section of a hinge joint with wire looping and clamp according to Figure 6.

Figure 8 shows a piece of fabric, bent into clamp form, with wire looping passed through.

Figure 9 shows the fastening of the piece of fabric provided with wire looping, placed astride the end of the belt and sewed thereto.

Figure 10 shows the fastening of the piece of fabric onto the end of the belt by vulcanisation; and Figure 11 shows the anchoring of the wire looping inserted according to the invention into the fold of the folded over end of the belt.

Figure 1:
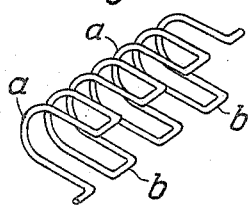
Figure 1 shows in perspective a continuous wire looping in the form of a so-called double zig-zag.

The undulated wire looping shown in Figure 1 is composed of a group of joint loops or eyes $a$ parallel to each other, the limbs of which, forming a group of anchor eyes $b$ also parallel to each other but transverse of the joint eyes $a$ and in planes intersecting the planes of the latter, are connected alternately in such manner that a continuous undulated hinge wire looping is created which is fitted astride the end of the belt.

Figure 2:
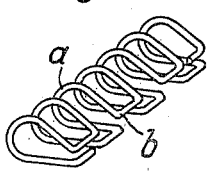
Figure 2 shows a diagram of the wire looping according to Figure 1 brought close together along one side.

In the embodiment according to Figure 2 the anchor loops $b$ are brought close to each other by being pressed down on one side, so that the limbs of joint loops $a$ converge toward each other. This embodiment is of particular advantage for thin belts or bands, as can be seen from Figures 8 to 11.

Figure 3:
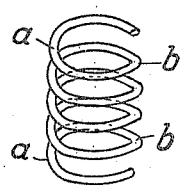
Figure 3 shows a diagram of wire looping in one-sidedly flat helical form.

The wire looping shown in Figure 3 consists of a helically wound wire in which the loops or eyes $b$ serving for the anchoring are more sharply curved, by depressing them on one side, than the hinge eyes $a$. For thicker belts however such a flattening on one side is not necessary. If desired, furthermore, the helical looping can be pressed flat in its entirety, so that both the hinge eyes and also the anchor eyes are narrowed.

Figure 4:
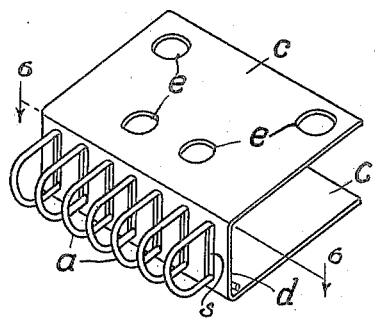
Figure 4 shows in perspective a U-shaped clamp combined with the wire looping according to Figure 1.

The U-shaped holder or clamp shown in Figure 4 consists of the cross bar, piece or joint portion $d$ and the flanks $c$. The cross piece $d$ is provided with a series of parallel slots $s$ through which pass the joint loops or eyes $a$ of the wire looping according to Figure 1, the anchor eyes $b$ resting on the inner surface of the cross piece. The U-clamp so fitted is placed astride the belt end with the two flanks $c$, and is united with the belt by means of rivets or the like passed through the holes $e$. It thus forms one half of the hinge of the belt fastener.

Figure 5:
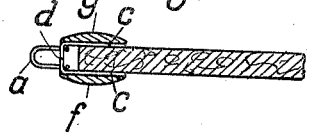
Figure 5 shows a section of Figure 6 on a reduced scale with a coating of the flanks of the clamp for moderating the slip.

According to Figure 5, there are applied to the outer sides of the flanks $c$ elements $f$ or $g$ which prevent slip.

Figure 6:
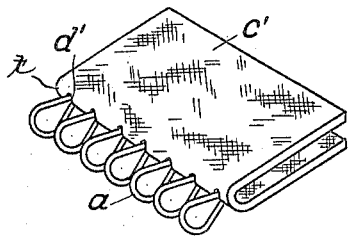
Figure 6 shows a section on line 6—6 of Figure 4.

In the embodiment according to Figures 6 and 7, a number of U-clamps co-operate with a single eye looping according to Figure 1, whose length corresponds to the width of the belt. The flanks $c$ of the U-clamps or holders are connected with the end of the belt by means of rivets $r$ or the like which are inserted through the holes $e$ in the sides or flanks. The hinge loops $a$ projecting from the slotted cross piece $d$ of the U-clamp and interengaging each other as shown in Figure 7, are held together in hinge form by the joint or hinge pin $m$.

According to Figure 8, the wire loops or eyes combined into a wire looping and pressed down (as shown at $b$ of Figure 2) are inserted in a band $c'$ of fabric. This is effected by the piece of fabric being folded over at $t$ and being perforated or slotted at points $d'$ of the fold, in such manner that the perforating tool does not penetrate the fibres of the fabric but presses them apart. The hinge loops $a$ are then passed through until the anchor eyes $b$ rest on the fold $d'$. The reinforced piece of fabric is then placed according to Figure 9, similar to the U-clamp according to Figure 4 astride the end $e$ of the belt or band and sewn thereto by rows of stitching $f$.

According to Figure 10, the reinforced piece of fabric placed astride the belt $e$ is vulcanized onto the belt. Thus, for example, the fabric impregnated with rubber and provided with the eye looping can be fitted to a thin rubber belt and then be united with this in a vulcanising press, so that a fine smooth joint is created. Instead of the vulcanisation, the piece of fabric provided with the eye looping can also be woven into the belt.

According to Figure 11, the piece of fabric for anchoring the wire looping can be replaced by simply folding over the end $g$ of the band or belt, whereupon the anchor eyes of the wire looping are inserted through the fold at $t'$ and the folded-over end of the belt is sewn to the other part of the belt at $cx$.

Having now particularly described and ascertained the nature of our said invention and in what manner the same is to be performed, we declare that what we claim is:

1. A device for joining two edges of flat material comprising a holder having means for fastening it to said material and a joint portion extending along one edge of said flat material, and an undulated hinge wire with two series of loops open at opposite sides, the loops of one series alternating with those of the other series, one loop series being parallel to a plane intersecting the edge direction of said flat material, and the other loop series intersecting said plane and being mounted in said joint portion.

2. A device for joining two edges of flat material comprising a holder having means for fastening it to said material and a joint portion extending along one edge of said flat material, and an undulated hinge wire with two series of loops open at opposite sides, the loops of one series alternating with those of the other series, one loop series being substantially normal to the edge direction of said flat material, and the other loop series being substantially parallel to said direction and mounted in said joint portion.

3. A device for joining two edges of flat material comprising an edge holder and an undulated hinge wire with two series of loops open at opposite sides, the loops of one series alternating with those of the other series, one loop series being crosswise to the edge direction of said flat material, and the other loop series being inclined to the first series, said holder being of U-shape with a cross piece having slots parallel to said second loop series, said first loop series extending through said slots, and the holder portions between said slots holding said second loop series.

4. A device for joining two edges of flat material comprising an edge holder of U-shaped cross section with flanks having means for fastening them to one edge of said flat material and a cross piece along said edge, and an undulated hinge wire forming two series of loops open at opposite sides, the loops of one series alternating with those of the other series, one loop series being substantially normal to the edge direction of said flat material, and the other series being substantially parallel to said direction and mounted in said cross piece.

5. A device for joining two edges of flat material comprising a holder having means for fastening it to said material and a joint portion extending along one edge of said flat material and an undulated hinge wire with two series of loops open at opposite sides, the loops of one series alternating with those of the other series, one loop series being parallel to a plane intersecting the edge direction of said flat material and having limbs converging toward each other, and the other loop series intersecting said plane and being mounted in said joint portion.

CURT GUSTAV MATTHAEI.
WILHELM KLOPF.